United States Patent Office 3,651,078
Patented Mar. 21, 1972

3,651,078
8-SUBSTITUTED-ACENAPHTH(1,2-d)OXAZOLE COMPOUNDS
Herman Eldridge Faith, Indianapolis, Ind., assignor to The Dow Chemical Company, Midland, Mich.
No Drawing. Filed Feb. 27, 1970, Ser. No. 15,255
Int. Cl. C07d 85/26
U.S. Cl. 260—307 D    4 Claims

ABSTRACT OF THE DISCLOSURE 8-substituted-acenaphth(1,2-d)oxazole compounds and their pharmaceutically-acceptable salts, such as 8-(dimethylamino)-6b-9a-dihydroacenaphth(1,2-d)oxazole hydrobromide are prepared by the reaction of 2-amino-1-acenaphthenol with a substituted organic nitrogen compound such as cyanogen bromide, diethyl carbamyl chloride, or propyl isocyanate. The novel compounds are useful as anoretic agents and are also useful as antimicrobials for the control of bacteria and fungi.

BACKGROUND OF THE INVENTION

Starting materials useful in the preparation of the compounds of this invention are disclosed by Fransesconi et al., Gaz. Chim. Ital., 33, 42 (1903).

SUMMARY OF THE INVENTION

This invention relates to acenaphth(1,2-d)oxazole compounds and is more particularly directed to 8-substituted-acenaphth(1,2-d)oxazole compounds corresponding to one of the formulae

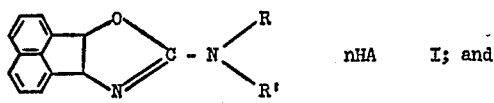

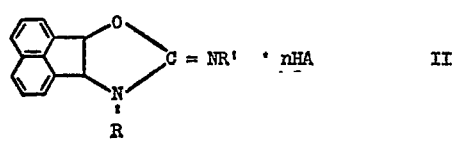

In the present specification and claims R and R' each independently represent hydrogen, methyl, ethyl or propyl; n represents one of the integers zero and one and HA represents the acid moiety of a pharmaceutically-acceptable salt. The term "pharmaceutically-acceptable salt" as herein employed refers to salts of acenaphth-(1,2-d)oxazole compounds which are substantially non-toxic at dosage rates consistent with good pharmacological activity. Such pharmaceutically-acceptable salts include non-toxic acid addition salts with inorganic acids such as hydrochloric, hydrobromic, sulfuric, nitric or phosphoric acid, or with organic acids such as acetic, succinic, lactic, malic, maleic, tartaric or citric acid.

For the sake of convenience, the compounds corresponding to the above Formulae I and II will be referred to hereinafter as "acenaphthoxazoles."

The acenaphthoxazoles of the invention are crystalline solids which are of varying degrees of solubility in aqueous acids and in organic solvents such as ether, alcohols, tetrahydrofuran, chlorinated hydrocarbons, lower alkanes and esters such as ethyl acetate and which are slightly soluble in water. The pharmaceutically-acceptable salts of the acenaphthoxazoles are crystalline solids which are slightly soluble in benzene and ethers and moderately soluble in water and alcohols.

The acenaphthoxazole compounds of the invention have been found to be useful for administration to laboratory animals in the study of drug effects on the central and peripheral nervous systems. They have been found to be particularly useful as anoretic agents for the suppression of appetite in mammals. They are also useful as antimicrobial agents for inhibiting and controlling the growth of fungi, such as Trichophyton species, Trichoderma species and Cephaloascus species, or bacteria, including species such as Escherichia, Staphylococcus, and Salmonella.

The novel compounds can be prepared by the reaction of 2-amino-1-acenaphthenol corresponding to Formula III with cyanogen bromide, or a substituted carbamyl chloride corresponding to Formula IV or a loweralkyl isocyanate corresponding to Formula V.

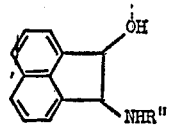

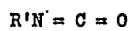

In the above Formulae III, IV and V, R and R' have the same significance as set out above with respect to Formula I and II, and R" represents hydrogen when R represents methyl, ethyl or propyl.

When cyanogen bromide is employed as a reactant, the reaction proceeds in the presence of a hydrogen halide acceptor directly with the formation of the tetracyclic acenaphthoxazole wherein R' is hydrogen. The product corresponds to Formula I when the 2-amino-1-acenaphthenol corresponds to Formula III wherein R" is hydrogen, and to Formula II where R" is methyl, ethyl or propyl. When a substituted carbamyl chloride is employed, the reaction proceeds with the formation of a 3-(2-hydroxy-1-acenaphthyl) - 1,1 - dimethylurea intermediate corresponding to Formula VI.

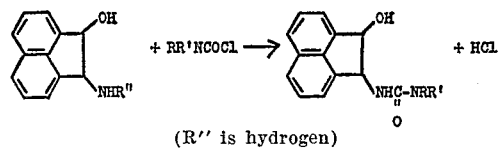

(R" is hydrogen)

Similarly, when the starting material is a loweralkyl isocyanate the reaction proceeds with the production of a 1-(2-hydroxy - 1 - acenaphthenyl) - 3 - loweralkyl urea corresponding to Formula VII.

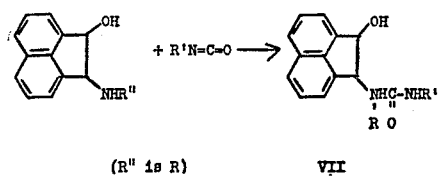

(R" is R)    VII

The intermediate urea derivatives corresponding to either of Formula VI or VII are then employed in a cyclization reaction carried out in polyphosphoric acid to produce the tetracyclic acenaphthoxazole product.

The reaction of the 2-amino-1-acenaphthenol with the cyanogen bromide, substituted carbamyl chloride or lower alkyl isocyanate proceeds when the reactants are contacted and mixed, typically in the presence of an inert organic liquid as a reaction medium, and in the presence of a hydrogen halide acceptor when cyanogen bromide or a substituted carbamyl chloride is employed as a reactant. Representative inert organic liquids which can be employed as reaction media include chloroform, tetrahydrofuran, methylene dichloride, ether, methanol, ethanol and ethylene dichloride. Representative hydrogen halide acceptors which can be employed include sodium acetate, sodium carbonate, trimethylamine, triethylamine, pyridine, lutidine and the like. The reaction proceeds at temperatures of from about 0° to about 100° C. and is preferably carried out at a temperature of from about 0° C. to about 30° C. The exact proportions of the reactants to be employed is not critical; however, the reaction consumes the 2-amino-1-acenaphthenol and the substituted organic nitrogen compound reactants in equimolar proportions and the reactants are preferably employed in such proportions. When the substituted organic nitrogen compound is cyanogen bromide or a substituted carbamyl halide, an excess of the hydrogen halide acceptor is preferably employed. The reaction is generally complete in about 1 to about 48 hours depending upon the reaction temperature employed. When salt by-products are formed by the reaction of the hydrogen halide of reaction with the hydrogen halide acceptor, they can be separated from the reaction mixture or from the product or urea derivative intermediate by filtration, decantation, extraction or the like. The acenaphthoxazole product or urea derivative intermediate can be separated by conventional procedures such as filtration when the intermediate or product precipitates in the reaction mixture, or by evaporation under reduced pressure to remove the reaction medium or the like. The separated material can be purified by recrystallization, extraction, washing, or other conventional procedures. In lieu of purification, the intermediate can be employed directly to prepare an acenaphthoxazole compound.

The cyclization of the urea derivative intermediate proceeds when the intermediate is contacted with excess polyphosphoric acid, and proceeds at temperatures of from about 10° to about 100° C. The intermediate compound is preferably contacted with polyphosphoric acid by dispersing about one part by weight of the intermediate in about 25 to about 50 parts by weight of polyphosphoric acid, and stirring or otherwise agitating the mixture to ensure thorough mixing. The cyclization reaction is generally complete in from about 15 to about 48 hours, after which the reaction mixture is diluted with water and the polyphosphoric acid is neutralized or made basic by the addition of an aqueous base, such as sodium or potassium hydroxide. The acenaphthoxazole product can then be separated by conventional procedures such as evaporation or extraction with organic solvents such as chloroform, methylene chloride or the like. The product can be purified by additional extraction, washing, recrystallization or the like. Alternately, the acenaphthoxazole product can be converted to a pharmaceutically-acceptable salt and purified in the form of the salt.

The pharmaceutically-acceptable salts of the acenaphthoxazoles are conveniently prepared by dissolving the free base compound in a solvent such as methanol, ethanol or ether and thereafter adding an excess of a pharmaceutically-acceptable acid such as hydrochloric, hydrobromic, sulfuric, malic, maleic or citric acid or the like until precipitation of the product is complete. The reaction is conveniently carried out at room temperature. The product can be separated by conventional procedures such as evaporation, filtration or centrifugation and purified by conventional procedures such as recrystallization.

The free base acenaphthoxazoles can be prepared from the salts by mixing the salt or a solution of the salt in a minimal amount of methanol with an excess of an aqueous base such as sodium hydroxide, potassium hydroxide or sodium carbonate. The free base acenaphthoxazole can be separated by conventional procedures such as extraction with an organic solvent such as benzene, ether, or a chlorinated hydrocarbon solvent. The free base can be purified by conventional procedures such as recrystallization or it can be converted to a pharmaceutically-acceptable salt.

The exact procedure to be employed and the particular acenaphthoxazole product produced are both dependent on the particular starting materials employed. Thus, when it is desired to prepare an acenaphthoxazole corresponding to Formula I wherein R and R' are both hydrogen, 2-amino-1-acenaphthenol (corresponding to Formula III wherein R" is hydrogen) can be reacted with cyanogen bromide, carbamyl chloride or isocyanic acid. With the latter two reactants, the product is then obtained in a two-step procedure involving cyclization of a urea derivative intermediate which corresponds either to Formula VI or to Formula VII. When R and R' are both hydrogen, the compound of Formula II is a tautomeric form of the compound of Formula I, and both forms of such acenaphthoxazole compound are included in the present invention.

When it is desired to prepare a compound of Formula I wherein either or both of R and R' are methyl, ethyl or propyl, 2-amino-1-acenaphthenol (corresponding to Formula III) wherein R" is hydrogen is reacted with an appropriate substituted carbamyl chloride of Formula IV or with an appropriate loweralkyl isocyanate of Formula V. In preparing an acenaphthoxazole of Formula II wherein R is methyl, ethyl or propyl, an N-substituted 2-amino-1-acenaphthenol corresponding to Formula III wherein R" is methyl, ethyl or propyl is employed as a starting material, the R" substituent in the N-substituted 2-amino-1-acenaphthenol corresponding to the R moiety of the desired product. The compounds of Formula II wherein R is methyl, ethyl or propyl and R' is hydrogen can be prepared in a one-step procedure by employing cyanogen bromide or in a two-step procedure, employing isocyanic acid. When R' is methyl, ethyl or propyl, the appropriate loweralkyl isocyanate of Formula V is employed, and the reaction proceeds by way of a 1-(methyl, ethyl or propyl)-1-(2-hydroxy-1-acenaphthenyl)-3-loweralkyl urea of Formula VII wherein R is methyl, ethyl or propyl and the subsequent cyclization of the urea derivative.

DESCRIPTION OF THE PREFERRED EMBODIMENTS

The following examples are illustrative of the invention, but are not to be construed as limiting the same.

Example 1

17 grams of acenaphthenequinone O-acetyl oxime, prepared either by acetylation of acenaphthenequinone oxime with acetic anhydride or acetyl chloride, is dispersed in 200 milliliters of tetrahydrofuran. Over a 20 minute period, 314 milliliters of a 1 molar solution of boron hydride in tetrahydrofuran is added to the mixture, at a temperature of —5° C. to +5° C. The mixture is held for 30 minutes at a temperature of 0° to 5° C. then heated to the boiling temperature over a 45 minute period and maintained at the boiling temperature under reflux for about 1.5 hours. A nitrogen atmosphere is maintained over the reaction mixture during the above operations. The mixture is cooled in an ice bath and 45 milliliters of 50 percent aqueous tetrahydrofuran are added thereto followed by 38 milliliters of aqueous 18 percent hydrochloric acid solution. The resulting mixture is evaporated under reduced pressure, made strongly basic (pH 10–12) by the addition of aqueous sodium hydroxide, and extracted with chloroform. The chloroform extract is dried over anhydrous sodium carbonate, treated with carbon, filtered, and then evaporated under reduced pressure. The 2-amino-1-acenaphthenol product is obtained as a residue from the evaporation, and is found to melt at 100°–103° C.

Example 2

Cyanogen bromide (7.35 grams; 0.068 mole) is dissolved in 10 milliliters of methanol. The solution is added portionwise over a 25 minute period to a solution of 2-amino-1-acenaphthenol (11.7 grams; 0.063 mole) and 82 grams of sodium acetate in 125 milliliters of methanol at a temperature of 5° C. The mixture is stirred at a temperature of about 25° C. for 20 hours. The mixture is evaporated under reduced pressure; the residue is taken up in aqueous sodium hydroxide solution (pH about 10–12); and then extracted with chloroform. The chloroform extract is dried with anhydrous sodium carbonate, filtered, and evaporated under reduced pressure. The 8-amino-6b,9a-dihydroacenaphth(1,2-d)oxazole product is obtained as a residue from the evaporation. The product is dispersed in a small amount of ethanol and the ethanol solution is mixed with excess hydrogen chloride until precipitation of the hydrochloride salt product is complete. The 8-amino-6b,9a-dihydroacenaphth(1,2-d)oxazole hydrochloride product is recrystallized from a mixture of methanol and ether and found to melt at a temperature of 240° C., with decomposition. The structure of the product is confirmed by infrared spectroscopy and elemental analysis.

Example 3

2-amino-1-acenaphthenol (10 grams; 0.054 mole), prepared as described above in Example 1, is dispersed in 95 milliliters of methylene chloride, and 10 milliliters of triethylamine are added to the dispersion. A solution of dimethylcarbamyl chloride (7.55 grams; 0.07 mole) in 5 milliliters of methylene chloride is added to the resulting mixture over a 25–30 minute period while the reaction mixture is maintained under a nitrogen atmosphere. The mixture is stirred at room temperature for 17 hours and is then heated at a temperature of 35° C. for 0.5 hour. The mixture is concentrated by evaporation under reduced pressure. The residue containing the 3-(2-hydroxy-1-acenaphthyl)-1,1-dimethyl urea intermediate in the form of a mixture of cis and trans isomers, is recrystallized from benzene and found to melt at 125°–145° C.

Five grams of the 3-(2-hydroxy-1-acenaphthyl)-1,1-dimethyl urea are dispersed with stirring in 155 grams of polyphosphoric acid at a temperature of 25°–30° C. and the mixture is stirred for 18 hours under ambient temperature. The mixture is diluted with water and filtered. The filtrate is cooled to a temperature of about 20° C., made basic (pH about 12) by the addition of aqueous sodium hydroxide solution, and extracted with chloroform. The chloroform extract is mixed with anhydrous sodium carbonate and activated carbon and filtered. The filtrate is evaporated under reduced pressure and the residue is recrystallized from benzene to obtain the 8-(dimethylamino)-6b,9a-dihydroacenaphth(1,2-d)oxazole product as a crystalline solid melting at 185°–186° C. The product is taken up in ethanol, treated with excess maleic acid, and the mixture is diluted with ether to precipitate the maleate salt. The precipitate is separated by filtration and dried, and the 8-(dimethylamino)-6b,9a-dihydroacenaphth(1,2-d)oxazole maleate product is found to melt at a temperature of 146°–157° C. The structure of the product is confirmed by elemental analysis, nuclear magnetic resonance analysis and infrared spectroscopy.

In substantially the same procedure as described above, the following acenaphthoxazole compounds are prepared.

8(N-propyl-N-methylamino)-6b,9a-dihydroacenaphth(1,2-d)oxazole, having a molecular weight of 266, is prepared by the reaction of N-propyl-N-methylcarbamyl chloride with 2-amino-1-acenaphthenol followed by the cyclization in polyphosphoric acid of the resulting 3-(2-hydroxy-1-acenaphthenyl)-1-methyl-1-polyurea.

8-(diethylamino)-6b,9a-dihydroacenaphth(1,2-d)oxazole, having a molecular weight of 266, is prepared by the reaction of diethyl carbamyl chloride with 2-amino-1-naphthenol and the cyclization in polyphosphoric acid of the resulting 3-(2-hydroxy-1-acenaphthenyl)-1,1-diethylurea.

8-(dipropylamino)-6b,9a-dihydroacenaphth(1,2-d)oxazole, having a molecular weight of 294, is prepared by the reaction of N,N-dipropylcarbamyl chloride with 2-amino-1-naphthenol and the cyclization in polyphosphoric acid of the resulting 3-(2-hydroxy-1-acenaphthenyl)-1,1-dipropylurea.

8-isopropylamino-6b,9a-dihydroacenaphth(1,2-d)oxazole, having a molecular weight of 252, is prepared by the reaction of N-isopropylcarbamyl chloride and 2-amino-1-acenaphthenol, followed by the cyclization in polyphosphoric acid of the resulting 3-(2-hydroxy-1-acenaphthenyl)-1-isopropylurea.

Example 4

2-amino-1-acenaphthenol (10 grams; 0.054 mole), prepared as described above in Example 1, is dispersed in 150 milliliters of methylene chloride and a solution of methyl isocyanate (3.7 grams; 0.065 mole) in 5 milliliters of methylene chloride is added to the resulting mixture while the mixture is maintained at a temperature of about 5° C. The mixture is stirred at a temperature of 5° C. for 0.5 hour, then allowed to come to ambient temperature and stirred at ambient temperature (about 25° C.) for 15 hours during which time a white precipitate forms in the reaction mixture. The mixture is filtered and the filter cake is washed with methylene chloride and ether. The 3-(2-hydroxy-1-acenaphthyl)-1-methylurea intermediate (mixture of cis and trans isomers), obtained as the filter cake, is recrystallized from ethanol and found to melt at 199°–201° C.

8.95 grams of the 3-(2-hydroxy-1-acenaphthyl)-1-methylurea are dispersed with stirring in 235 grams of polyphosphoric acid at a temperature of 25°–30° C. and the mixture is stirred for 24 hours under ambient temperature. The mixture is then diluted with water and filtered. The filtrate is cooled to a temperature of about 20° C., made basic (pH about 12) by the addition of aqueous sodium hydroxide solution, and extracted with chloroform. The chloroform extract is evaporated under reduced pressure and the residue is mixed with aqueous dilute hydrochloric acid (about 0.5 Normal). The acid mixture is filtered and the filtrate is made basic (pH 12) by the addition of aqueous sodium hydroxide solution, and extracted with chloroform. The chloroform extract is evaporated under reduced pressure to obtain the 8-(methylamino)-6b,9a-dihydroacenaphth(1,2-d)oxazole product as the free base. The free base product is dissolved in an ethanol solution containing excess hydrochloric acid, and anhydrous ether is added to the mixture until precipitation is complete. The precipitate is separated by filtration and dried, and the 8-(methylamino)-6b,9a-dihydroacenaphth(1,2-d)oxazole hydrochloride product is found to melt at a temperature of 214°–215° C. The structure of the product is confirmed by elemental analysis and infrared spectroscopy.

In substantially the same procedure as described above, the following acenaphthoxazole compounds are prepared.

8-(propylamino)-6b,9a-dihydroacenaphth(1,2-d)oxazole hydrobromide, having a molecular weight of 333, is prepared by cyclization in polyphosphoric acid of 3-(2-hydroxy-1-acenaphthenyl)-1-propylurea obtained by reacting propylisocyanate with 2-amino-1-acenaphthenol in the procedure described above, and treating the free base with alcoholic hydrogen bromide.

8-(ethylamino)-6b,9a-dihydroacenaphth(1,2-d)oxazole, having a molecular weight of 238, is prepared by cyclization in polyphosphoric acid of 3-(2-hydroxy-1-acenaphthenyl)-1-ethylurea prepared by reacting ethyl isocyanate with 2-amino-1-acenaphthenol in the procedure described above.

Example 5

A mixture of 2-amino-1-acenaphthenol (19.6 grams; 0.11 mole) and sodium methoxide (2 grams; 0.04 mole)

in 125 milliliters of diethyl carbonate is heated at the boiling temperature to distill off 25 milliliters of a mixture of ethanol of reaction and diethyl carbonate over a 1.5 hour period. The mixture is then cooled to a temperature of about 25° C. and filtered. The filter cake is washed with dilute aqueous hydrochloric acid solution and then recrystallized from ethanol and treated with decolorizing carbon. The 9,9a - dihydroacenaphth(1,2 - d) oxazol-8-(6bH)-one thus purified is found to melt at a temperature of 211°–212° C. 6.6 grams of the 9,9a-dihydroacenaphth-1,2-d)oxazol-8(6bH)-one and 2 grams of lithium aluminum hydride are mixed together in 200 milliliters of tetrahydrofuran. The mixture is heated at the boiling temperature under reflux for 4 hours, after which the mixture is cooled, treated with aqueous acid and water in conventional fashion to remove unreacted lithium aluminum hydride and evaporated under reduced pressure. The residue is mixed with aqueous sodium hydroxide (pH 10–12). The basic mixture is extracted with chloroform, the chloroform extract is evaporated and the 2-methylamino-1-acenaphthenol product is obtained as a crystalline solid residue and found to melt at a temperature of 113°–115° C.

Example 6

Cyanogen bromide (2.55 grams; 0.016 mole) is mixed with the 2-methylamino-1-acenaphthenol of Example 5 (4.5 grams; 0.022 mole) and 5.6 grams of sodium acetate in 70 milliliters of methanol at a temperature of 5° C. The mixture is stirred at a temperature of about 25° C. for 20 hours, after which the mixture is evaporated under reduced pressure. The residue is stirred with aqueous ammonium hydroxide solution (pH about 12), and the mixture is filtered. The filter cake is dried in vacuo and the dried 6b,8,9,9a-tetrahydro - 8 - imino-9-methylacenaphth-(1,2-d)-oxazole free base obtained as the filter cake. The filter cake is dispersed in a small amount of ethanol. The ethanol solution is mixed with excess hydrogen chloride until precipitation of the hydrochloride salt product is complete. The 6b,8,9,9a-tetrahydro - 8 - imino-9-methylacenaphth(1,2-d) oxazole hydrochloride product is found to melt at a temperature of 247° C., with decomposition. The structure of the product is confirmed by elemental analysis, nuclear magnetic resonance analysis and infrared spectroscopy.

In substantially the same procedure as described above in Example 4, 6b,8,9,9a-tetrahydro-8-(propylimino)-9-propylacenaphth(1,2-d)oxazole, having a molecular weight of 294, is prepared by reacting propylisocyanate with 2-propylamino-1-acenaphthenol; followed by cyclization in polyphosphoric acid of the 3-(2-hydroxy-1-acenaphthenyl)-1,3-dipropylurea obtained in such reaction.

In substantially the same procedure as described above in Example 4, 6b,8,9,9a-tetrahydro-8-ethylimino-9-methylacenaphth(1,2-d) oxazole hydrobromide, having a molecular weight of 252, is prepared by reacting ethylisocyanate with 2-methylamino-1-acenaphthenol to obtain 3-(2-hydroxy - 1 - acenaphthenyl)-3-methyl-1-ethylurea; by cyclization of the urea derivative in polyphosphoric acid and by treating the free base acenaphthoxazole with alcoholic hydrogen bromide.

In substantially the same procedure as described above in Example 4, 6b,8,9,9a-tetrahydro-8-(methylimino)-9-ethylacenaphth(1,2-d)oxazole, having a molecular weight of 252, is prepared by reacting methylisocyanate with 2-ethylamino-1-acenaphthenol to obtain 3-(2-hydroxy-1-acenaphthenyl)-3-ethyl-1-methylurea, followed by cyclization of said urea derivative in polyphosphoric acid.

In employing the acenaphthoxazole compounds of the invention for the suppression of appetite in animals, the compounds are administered internally to an animal in an anoretic amount. Generally, from about 5 or less to about 50 or more milligrams of compound per kilogram of animal body weight, depending upon such factors as the exact compound or salt employed, the route of administration and the animal being treated. The compounds can be administered by conventional procedures such as intraperitoneal, subcutaneous, or intramuscular injections or by oral administration. The acenaphthoxazole compounds can be formulated by conventional procedures in treating composition by admixture of one or more acenaphthoxazole compounds of the invention with a pharmaceutical carrier and can be formulated as sterile injectable compositions, tablets, capsules and the like. In employing the acenaphthoxazole compounds of the invention in the control of microorganisms such as bacteria and fungi, an antimicrobial amount of one or more of the compounds is applied to the organisms, their habitats or to substrates subject to microbial attack. The compounds can be applied by conventional procedures such as dusting, drenching, impregnation, spraying, or the like. They can be formulated by conventional procedures to provide antimicrobial compositions by admixture of one or more acenaphthoxazole compounds of the invention with an adjuvant such as surface active dispersing agents, inert liquid carriers, finely divided solid carriers, and the like.

In representative operations, complete inhibition and control of *Staphylococcus aureus* is obtained when separate nutrient agar compositions containing one of 8-amino - 6b,9a - dihydroacenaphth(1,2-d)oxazole hydrochloride or 8 - (methylamino) - 6b,9a - dihydroacenaphth(1,2-d)oxazole hydrochloride in an antimicrobial concentration of 500 parts by weight of acenaphthoxazole compound per million parts by weight of ultimate composition are inoculated with viable cell suspensions of the named organism and incubated under conditions conducive to microbial growth. In similar operations carried out as a check, vigorous luxuriant growth of *Staphylococcus aureus* is obtained when similar nutrient agar containing no acenaphthoxazole compound is similarly inoculated and incubated. In other operations, complete inhibition and control of *Escherichia coli, Bacillus subtilis, Trichophyton mentagrophytes, Salmonella typhosa, Mycobacterium phlei, Ceratocystis ips* and *Cephaloascus fragrans* is obtained when nutrient agar containing 500 parts of 8-amino-6b,9a-dihydroacenaphth(1,2-d)oxazole hydrochloride per million parts of ultimate composition are inoculated with said organisms and incubated under conditions conducive to microbial growth.

What is claimed is:

1. An acenaphth(1,2-d)oxazole compound corresponding to the formula:

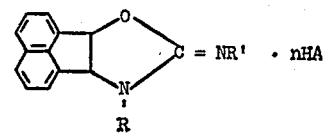

wherein R and R' each independently represent hydrogen, methyl, ethyl or propyl; $n$ represents one of the integers zero and one; and HA represents the acid moiety of a pharmaceutically-acceptable salt.

2. A compound of claim 1 corresponding to the formula

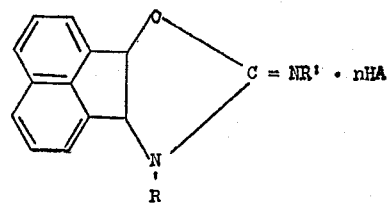

and wherein R represents methyl, ethyl or propyl.

3. A compound of claim 1 wherein the compound is 6b,8,9,9a - tetrahydro-8-imino-9-methylacenaphth(1,2-d)-oxazole hydrochloride.

4. A compound of claim 1 wherein the compound is 6b,8,9,9a - tetrahydro-8-imino-9-methylacenaphth(1,2-d)-oxazole hydrochloride.

References Cited

King et al. C.A. 45, 2934 h (1951).

ALEX MAZEL, Primary Examiner

R. V. RUSH, Assistant Examiner

U.S. Cl. X.R.

260—553 A, 571; 424—272

PO-1050
(5/69)

UNITED STATES PATENT OFFICE
CERTIFICATE OF CORRECTION

Patent No. 3,651,078　　　　　　　Dated　　21 March 1972

Inventor(s)　Herman Eldridge Faith

It is certified that error appears in the above-identified patent and that said Letters Patent are hereby corrected as shown below:

Column 9, line 3, delete "hydrochloride".

Signed and sealed this 25th day of July 1972.

(SEAL)
Attest:

EDWARD M. FLETCHER, JR.　　　　ROBERT GOTTSCHALK
Attesting Officer　　　　　　　Commissioner of Patents